(12) United States Patent
Horowitz et al.

(10) Patent No.: US 8,750,373 B2
(45) Date of Patent: Jun. 10, 2014

(54) DELAY AWARE RATE CONTROL IN THE CONTEXT OF HIERARCHICAL P PICTURE CODING

(75) Inventors: Michael Horowitz, Austin, TX (US); Wonkap Jang, Edgewater, NJ (US); Ofer Shapiro, Fair Lawn, NJ (US)

(73) Assignee: Vidyo, Inc., Dallas, TX (US)

( * ) Notice: Subject to any disclaimer, the term of this patent is extended or adjusted under 35 U.S.C. 154(b) by 292 days.

(21) Appl. No.: 13/010,570

(22) Filed: Jan. 20, 2011

(65) Prior Publication Data

US 2012/0082214 A1    Apr. 5, 2012

Related U.S. Application Data

(60) Provisional application No. 61/389,499, filed on Oct. 4, 2010.

(51) Int. Cl.
*H04N 7/12* (2006.01)

(52) U.S. Cl.
USPC .................................................. 375/240.03

(58) Field of Classification Search
None
See application file for complete search history.

(56) References Cited

U.S. PATENT DOCUMENTS

| | | | |
|---|---|---|---|
| 6,137,793 A * | 10/2000 | Gorman et al. | 370/360 |
| 7,813,385 B1 * | 10/2010 | Hyun et al. | 370/508 |
| 2001/0023454 A1 | 9/2001 | Fitzgerald | |
| 2002/0018523 A1 * | 2/2002 | Jayant et al. | 375/240.08 |
| 2004/0071212 A1 | 4/2004 | Gu et al. | |
| 2007/0230566 A1 * | 10/2007 | Eleftheriadis et al. | 375/240.1 |
| 2008/0117930 A1 | 5/2008 | Chakareski et al. | |
| 2008/0138032 A1 * | 6/2008 | Leyendecker et al. | 386/66 |
| 2009/0284581 A1 * | 11/2009 | Elbaz et al. | 348/14.12 |
| 2010/0189183 A1 * | 7/2010 | Gu et al. | 375/240.28 |

OTHER PUBLICATIONS

International Search Report—International Application No. PCT/US2011/021858, International Filing Date: Jan. 20, 2011.

* cited by examiner

*Primary Examiner* — Sath V Perungavoor
*Assistant Examiner* — Kate Luo
(74) *Attorney, Agent, or Firm* — Baker Botts L.L.P.

(57) ABSTRACT

The present invention provides bit rate control techniques for a hybrid block based motion compensated predictive video encoder (e.g., H.264, as well as other video coding algorithms and standards). The techniques aim to reduce the picture-to-picture bit rate fluctuations within a prediction structure or over a short time interval that can lead to undesirable additional delay on links without over-provisioned capacity. In one embodiment of the present invention, the end to end delay is estimated. The end to end delay is used to determine limits on the modulation of the target coded picture size, with the goal of trading an acceptable amount of additional delay for a better coding efficiency.

9 Claims, 5 Drawing Sheets

FIG. 1: VIDEO CONFERENCING SYSTEM

FIG. 2: VIDEO ENCODER

FIG. 3: PREDICTION STRUCTURE

FIG. 4: COMPUTATION OF *maxRatio*

FIG. 5: BIT RATE FLUCTUATION CONTROL

DELAY AWARE RATE CONTROL IN THE CONTEXT OF HIERARCHICAL P PICTURE CODING

CROSS-REFERENCE TO RELATED APPLICATIONS

This application claims the benefit of priority to U.S. Provisional Application Ser. No. 61/389,499, filed Oct. 4, 2010 for "Delay Aware Rate Control In The Context Of Hierarchical P Picture Coding," which is hereby incorporated by reference herein in its entirety.

FIELD OF THE INVENTION

The present invention relates to bit rate control in an H.264 or similar video encoder as a function of the total time required for a video signal to be captured, encoded, transported, decoded, and displayed. In particular, the present invention relates to mechanisms for reducing picture-to-picture bit rate fluctuations for an encoder employing a flat or hierarchical prediction structure in order to reduce the fluctuations in the size of coded pictures by transporting the coded pictures, as close to a link's bandwidth capacity.

BACKGROUND OF THE INVENTION

Subject matter related to the present application can be found in the co-pending U.S. Provisional application Ser. No. 12/897,365, filed Oct. 4, 2010, and entitled "Automatic Temporal Layer Bit Allocation;" Ser. No. 12/015,956, filed Jan. 17, 2008 and entitled "System and Method for Scalable and Low-Delay Videoconferencing Using Scalable Video Coding;" Ser. No. 11/682,263, filed Mar. 5, 2007 and entitled "System and Method for Providing Error Resilience, Random Access and Rate Control in Scalable Video Communications;" and Ser. No. 11/608,776, filed Dec. 8, 2006 and entitled "Systems and Methods for Error Resilience and Random Access in Video Communication Systems"; as well as U.S. Pat. No. 7,593,032, filed Jan. 17, 2008 and entitled "System and Method for a Conference Server Architecture for Low Delay and Distributed Conferencing Applications." All of the aforementioned related applications and patents are hereby incorporated by reference herein in their entireties.

It is important for an interactive video communications system (e.g., a video conferencing system) to optimize the one-way delay that is perceived by the user, to ensure a natural user experience. Several factors contribute to the total one-way delay, including, for example, video capture, pre-processing, encoding, packetization, network transmission, de-packetization, decoding, post-processing, and rendering times. The present invention relates to delay introduced by the network transmission time.

In the following description, the terms "link," "link capacity," "link bandwidth," and so on are frequently used. These terms should be interpreted broadly. Specifically, the term "link" refers to any physical or virtual network connection between a sending unit and a receiving unit, based on any suitable physical infrastructure and protocol hierarchy. To make two examples, both an ISDN b channel and the virtual "connection" between two units over the Internet, using an IP/UDP/RTP protocol hierarchy, qualify as a "link." If a more narrow interpretation of the term is intended, suitable attributes will accompany the term link.

Further, "link capacity" or "link bandwidth" refers to the mid-term average number of bits that can be transported over a link according to the above definition. "Mid-term" refers to a time interval of, for example, a few seconds to a few minutes—short enough to ensure that fluctuations in the available bit rate in the case of TCP-fairly behaving connections are covered by this definition. In most protocol hierarchies, the link capacity in the aforementioned sense is limited by four factors: (1) the capacity of the physical link(s) involved in the end-to-end connection, (2) the possibly static allocation of bit rates on this physical link (i.e., the allocation between audio and video bits in H.320-type video conferencing systems), (3) the typically dynamic allocation of bits between different applications' traffic (i.e., video conferencing and web access), and (4) bandwidth throttling mechanisms that are part of the protocol infrastructure (i.e., TCP fairness related bandwidth management). Depending on the system architecture, factors (2), (3) and (4) can be indistinguishable from each other.

What is common to all four categories is that modern protocol hierarchies allow for the estimation of the limiting factors, consequently enabling an application to determine, the amount of bits it can use over a reasonable time interval (for example, a few seconds) without triggering excessive failures such as very high packet loss rates. This amount of bits, divided by the time interval's duration, is herein referred to as "link capacity." In a more a complex example, a video conferencing session running on a PC over the Internet to another similar setup involves all four factors: the limitations of the physical links and Internet routers, network traffic that is non-video conference related but conveyed over the same physical links and routers, fixed allocations of bits for the audio data (which must be conveyed with a higher priority than video bits), and both TCP fairness and multi-application use of, and between, the video transmission and other (i.e., web browsing) traffic.

The term "bandwidth-limited link" refers to any physical or virtual connection that is constrained by a link capacity in the aforementioned sense.

The time required to convey a coded picture of video sequence, as produced by an encoder, over a bandwidth-limited link in the above sense obviously varies with the size of the coded picture. Keeping the coded picture size as small as possible enables the lowest delay possible. However, in video coding, the more bits that are spent on a given picture, the better the resulting quality, which can be as desirable as low delay from a user's viewpoint. Assuming low delay is the overriding priority, in order to present a user the lowest possible delay (first priority) at the best possible quality (second priority), the coded picture size in bits has to be the inverse of the number of pictures transmitted per unit time multiplied by the link capacity, in bits, over the same time period. This situation is well known among those skilled in the art (see for example ["Rate control in DCT video coding for low-delay communications", Ribas-Corbera, J, and Lei, Shawmin, IEEE Transactions on Circuits and Systems for Video Technology. Vol. 9, no. 1, pp. 172-185. February 1999]).

An example can illustrate the relationship of delay, coded picture size, and link bandwidth. Receivers may not display a picture until the coded picture has been received in its entirety, decoded, and possibly post-processed. Such a receiver is assumed in the following example. Further assumed is a bandwidth-limited link in the aforementioned sense. The percentage of the bandwidth of the link's capacity allocated for video can be less than 100% in the case of links shared between more than one user/application/service, or in the case of multimedia communication. Further, assumed are a fixed video frame rate and a desire for good picture quality. Under these constraints, the lowest end-to-end delay is achieved when all coded pictures are of the same size. Large fluctuations in coded picture sizes, and resulting fluctuations in the transmission times of the coded pictures, should be avoided. In order to play back video at the original frame rate, a receiver must buffer decoded pictures or coded video bits taking into account a pessimistic (i.e., worst likely case) assumption of the maximum number of bits for a coded picture. A mechanism that ensures no, or only small, fluctuation in coded picture size can permit the receiver to keep the buffers small, and be optimized for low delay.

Figure 1:
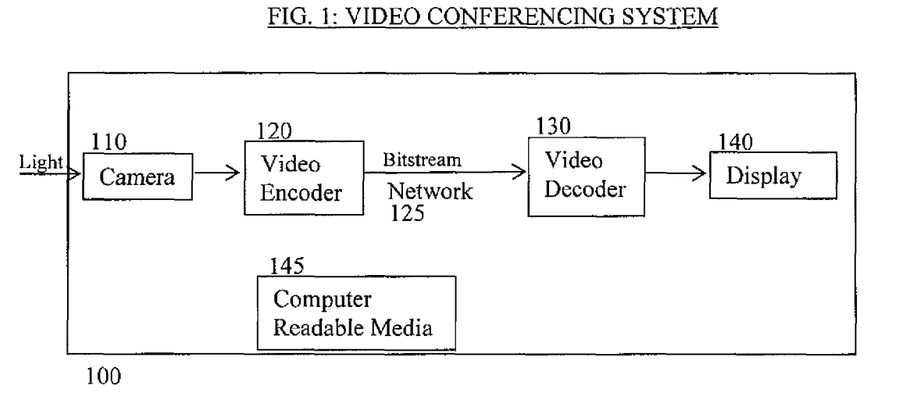
FIG. 1 is a schematic illustration of a background art exemplary video conferencing system.

FIG. 1 shows an exemplary video conferencing system. The system 100 can, for example, include a camera 110 that collects light and converts it to a digital video signal (i.e., a sequence of digital video pictures), a video encoder 120 that encodes the video pictures and places the resulting bitstream onto a network 125. A video decoder 130 decodes the bitstream received from network 125—that can be sent from a similar system—producing a sequence of digital video pictures that are rendered on display 140. The video encoder 120 and/or video decoder 130 can be implemented, at least in parts, on programmable hardware, such as a general purpose CPU, a DSP, or a similar device. In order to enable the operation of the programmable hardware, the system may utilize a computer readable media 145, such as Flash ROM, ROM, CD ROM, DVD ROM, hard drive, or memory stick, containing instructions arranged to enable the programmable hardware to execute mechanisms as discussed below. While the invention is described in the context of a video conferencing system, it should be obvious to a person skilled in the art that other forms of systems involving video transmission can also take advantage of the invention. For example, an entertainment quality video capture/coding/transmission system optimized for live transmissions can benefit from the invention as well. Further, in certain environments, the camera 110 can be replaced by any other source for digital, uncompressed picture data (such as a digital video tape recorder, or the output of a computer based renderer that creates video). Similarly, the display 140 can be replaced by one or more other devices that use uncompressed digital picture data, such as a digital video recorder, data projector, or similar devices. The network 125 can be any form of a digital data network of sufficient bandwidth and service quality to support the encoder 120 and decoder 130.

In this disclosure, the glass-to-glass delay of a video conferencing system in operation is the time interval between the instant in which light from a scene enters the camera 110, to the instant a corresponding picture of that scene is presented on the display 140, excluding network transit time. The glass-to-glass delay can be measured by placing an encoding video conferencing system and a decoding video conferencing system (or any other appropriate system, including traffic generators/analyzers and such) in close physical proximity to each other, and connecting them using a network that offers substantially the same traffic characteristics (in terms of bandwidth, MTU size, and similar parameters) as the target network, with a known transmission delay. The glass-to-glass delay is the time difference between the capture and display of a stimulus video signal, minus the known signal transmission delay.

This disclosure also refers to "one way delay," or "end to end delay." If used without any qualifiers (such as glass-to-glass), both terms refer to the glass-to-glass delay as defined above plus the transmission delay, i.e., they refer to the delay as observed by the remote user, irrespective of the technical factors that contribute to them.

In video conferencing scenarios involving RTP/RTCP or similar application layer protocol media transmission standards, the network delay can be determined by both encoding and decoding systems through the monitoring of the RTCP receiver reports in conjunction with the RTP sender reports. The details of this measurement technology can be found in IETF RFC 3550, available at http://www.ietf.org/rfc/rfc3550.txt.

In modern video coding standards, the content of the picture being encoded (hereafter called the "input picture") is predicted and the encoder encodes the difference between the input picture and the prediction it creates. One prediction method, inter-picture prediction, builds a prediction for the input picture by referencing the contents of one or more other pictures in the video reproduced sequence. Traditional video conferencing systems can use, for example, the picture occurring immediately before the input picture as the reference from which the input picture prediction is created.

One technique that can advantageously be used in low delay video transmission applications is known as temporal scalability. Temporal scalability refers to techniques in which the prediction structure between pictures is chosen such that it is possible to drop a subset of the coded pictures (belonging to one or more temporal enhancement layers, also known as threads) from decoding without negatively affecting the inter picture prediction relationships. In the context of the invention, any threaded picture structure can be used, such as those described in co-pending U.S. patent application Ser. No. 12/015,956, including the degenerated threaded picture structure that has only a single thread (which is similar to tradition IPPPP video coding, in which there is a reference only to previous picture(s), and no temporal scalability). As the invention can advantageously be practiced in conjunction with temporal scalability, a brief introduction to one temporal layering scheme is included.

Figure 3:
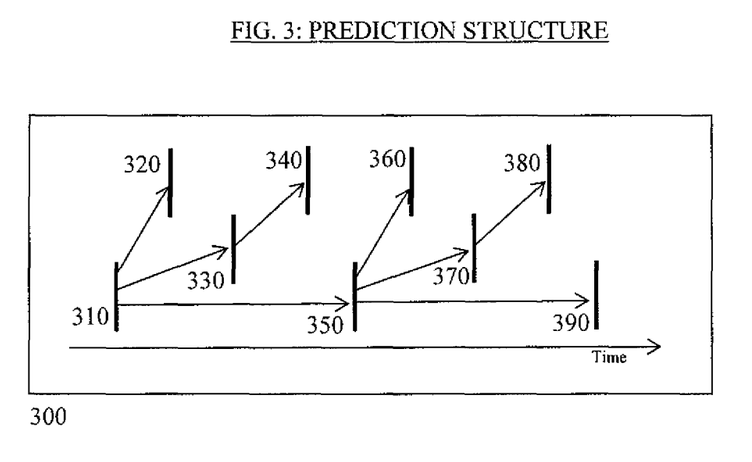
FIG. 3 is an illustration of a background art exemplary hierarchical prediction structure.

Depicted in FIG. 3 is a four-picture prediction structure. Bold vertical lines are used to depict video pictures (310, 320, 330, etc.), the arrows point from the picture being used as a motion compensated reference to the input picture, and time progresses from left to right. The video picture 310 can be an intra coded picture (i.e., a picture for which a prediction is built using content from spatially adjacent blocks within the same picture as opposed to inter-picture prediction) or can be predicted from an earlier picture not shown in FIG. 3. Picture 320 references picture 310 to create its prediction while picture 330 also uses picture 310 as its reference. Picture 340 uses picture 330 as a reference and picture 350 uses 310; the prediction structure repeats in this manner until the entire sequence is encoded. No picture references pictures 320, 340, 360, or 380. As such, these pictures can be removed from the coded video sequence, thereby reducing the video frame rate in half, without disrupting the prediction chain. In contrast, the removal of picture 310 directly breaks the prediction of all pictures using it as a reference, and indirectly breaks the prediction of all remaining pictures. Once pictures 340 and 380 are removed, pictures 330 and 370 are no longer used as references and can also be removed, reducing the frame rate in half again, without breaking the prediction chain. In this way, the prediction pattern imparts a hierarchical structure onto the pictures. The hierarchical structure is emphasized in FIG. 3 through the use of vertical offsets of the picture representations. Pictures 320, 340, 360, and 380 are often said to belong to the highest temporal layer, while pictures 310 and 350 belong to the temporal base layer. The prediction structure shown in FIG. 3 and others having similar hierarchical properties are referred to as a "hierarchical prediction structure" or "threaded prediction structure." Other hierarchical prediction structures, such as ones with more or fewer temporal layers, longer prediction periods and/or including bi-predicted pictures (B-pictures), can also be advantageous; the choice of prediction structure is determined by the application and is not a subject of this disclosure.

In addition to the advantage that the frame rate can be reduced by simply removing certain coded pictures, the hierarchical prediction structure imparts a natural error resilience to the coded bitstream since transmission errors in non-base layer pictures (three out of every four pictures in the prediction structure shown in FIG. 3) are not propagated indefinitely as they would be in a more traditional non-hierarchical prediction structure. Examples designed to exploit the hierarchical prediction structure are described in co-pending U.S. patent application Ser. Nos. 11/608,776 and 11/682,263.

In practical low delay systems, such as video conferencing systems, the user experience can be greatly enhanced by adequately balancing the legitimate desires of both coding efficiency (which can lead to large fluctuations in the size of coded pictures) and low delay (which requires a uniform size of coded pictures). Therefore, it is advantageous to include a mechanism to control coded picture size as a function of the measured one-way delay.

SUMMARY OF THE INVENTION

The present invention provides bit rate control techniques for a hybrid block based motion compensated predictive video encoder (e.g., H.264, as well as other video coding algorithms and standards). The techniques aim to reduce the picture-to-picture bit rate fluctuations within a prediction structure or over a short time interval that can lead to undesirable additional delay on links without over-provisioned capacity. The picture-to-picture bit rate fluctuation is henceforth also referred to as picture size modulation.

In some scenarios, the invention can improve coding efficiency. Modulation of the coded picture size, when used in combination with certain prediction structures, can lead to coding efficiency gains compared with more traditional encoding techniques, as explained below.

In one embodiment of the present invention, the end to end delay is estimated. The end to end delay is used to determine limits on the modulation of the target coded picture size, with the goal of trading an acceptable amount of additional delay for a better coding efficiency.

In the same or another embodiment, the modulation involves a first pre-determined upper threshold for the additional delay introduced by the modulation, so as to keep the end to end delay within an acceptable range.

In the same or another embodiment, the modulation involves a second pre-determined lower threshold for the additional delay introduced by the modulation, so as to keep the coding efficiency within an acceptable range.

In the same or another embodiment, if the end to end delay exceeds a third specified threshold, the magnitude of the picture size modulation is reduced gradually, advantageously in an increasing manner as the one way delay increases, thereby reducing the one way delay.

In the same or another embodiment, if the one way delay drops below a fourth threshold, the magnitude of the picture size modulation is increased gradually, advantageously in an increasing manner as the one way delay decreases, thereby improving coding efficiency.

In the same or another embodiment, the target coded picture size for at least one picture in a pre-determined prediction structure is modulated independently from at least one other picture in the prediction structure, based on the prediction relationship of the at least two pictures of the prediction structure.

In the case of a multipoint call, one way delay can differ from one far-end participant to the next. In the same or another embodiment, the maximum one way delay over all far-end participants in a call that receives coded video from a particular encoder is used to determine limits on the modulation of the target coded picture size for that encoder.

In the same or another embodiment, alternatively or in addition, in a multipoint call it can be advantageous to use a weighted average of the one way delay values over all far-end participants in a call that receives coded video from a particular encoder to determine limits on the modulation of the target coded picture size for that encoder. In addition, in the same or another embodiment, in a multipoint call it can be advantageous to use the median of the one way delay values over all far-end participants in a call that receives coded video from a particular encoder to determine limits on the modulation of the target coded picture size for that encoder.

BRIEF DESCRIPTION OF THE DRAWINGS

Further features, the nature, and various advantages of the present invention will be more apparent from the following detailed description of the preferred embodiments and the accompanying drawings in which.

The Figures are incorporated and constitute part of this disclosure. Throughout the Figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

Figure 2:
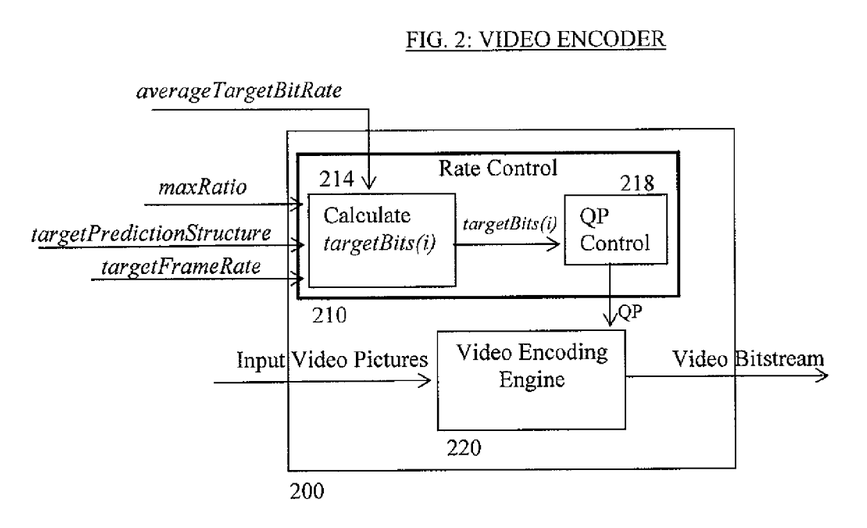
FIG. 2 is a schematic illustration of an exemplary video encoder and associated rate control in accordance with the present invention.

FIG. 2 shows a more detailed schematic of a video encoder 200 according to the invention. The video encoder 200 includes a rate control module 210 and a video encoding module 220 that processes input digital video pictures to produce a video bitstream. The rate control module 210 includes a target bit rate calculator 214 and a Quantizer Parameter (QP) control module 218. The functional relationship between these modules is as follows:

The video encoding module 220 translates the incoming uncompressed video pictures into a video bitstream. To do so, this module can require a number of parameters. The parameter of interest with respect to the present invention is the Quantizer Parameter (QP); other parameters are neither depicted nor described. Accordingly, the video encoding module 220 receives the QP from the QP control module 218.

The QP control module 218 translates an input target bit budget per to-be-coded picture targetBits(i) into a QP. Many possible implementations for this functionality have been described in the background art; see for example ["Rate control in DCT video coding for low-delay communications" by Ribas-Corbera, above]). The interaction between the QP control module 218 and the video encoding module 220 should be immediately recognizable as a standard implementation technique in constant bit rate coding by a person skilled in the art.

The target bit rate calculator 214 is where the functionality of the invention presented resides.

The target bit rate calculator 214 determines the target number of bits, targetBits(i), for each of N pictures, i=0 to N−1, in the prediction structure. In the case of a flat prediction structure (i.e., no temporal scalability), N=1. The target bit rate calculator 214 takes as input several parameter values, including targetPredictionStructure, which describes the desired temporal prediction structure, targetFrameRate, which specifies the target frame rate of the coded video sequence, averageTargetBitRate, which specifies the average bit rate target for the bitstream which can be determined by using a mechanism such as the one described in the co-pending U.S. patent application Ser. No. 12/897,365, and maxRatio, a function of oneWayDelay used to define a limit on bit rate fluctuations. A detailed description of how maxRatio is used to limit bit rate fluctuations is presented later after the computation of maxRatio is described. TargetPredictionStructure can be a system level parameter that is decided upon by call establishment protocol implementations (not depicted) based on factors such as network topology, connectivity, and so on. TargetFrameRate can also be a system level parameter that can depend on the user's preferences as input through a user interface (not depicted), and the capabilities of the communication partners as established through a call establishment protocol implementation (not depicted).

The QP control module 218 selects QP values to achieve the target bit rates. In today's video compression standards, the relationship of the QP to the number of bits generated when coding is such that a higher QP never leads to a higher bit rate, and in many cases to a lower bit rate. Conversely, coding at a lower QP leads in many cases to a higher bit rate.

Accordingly, it is common for the QP control to select higher QP values to achieve lower bit rates in the higher temporal layers and lower QP values to achieve higher bit rates in the lower temporal layers. Assigning different QP values for pictures in different layers in this manner is sometimes referred to as "QP scaling".

Figure 4:
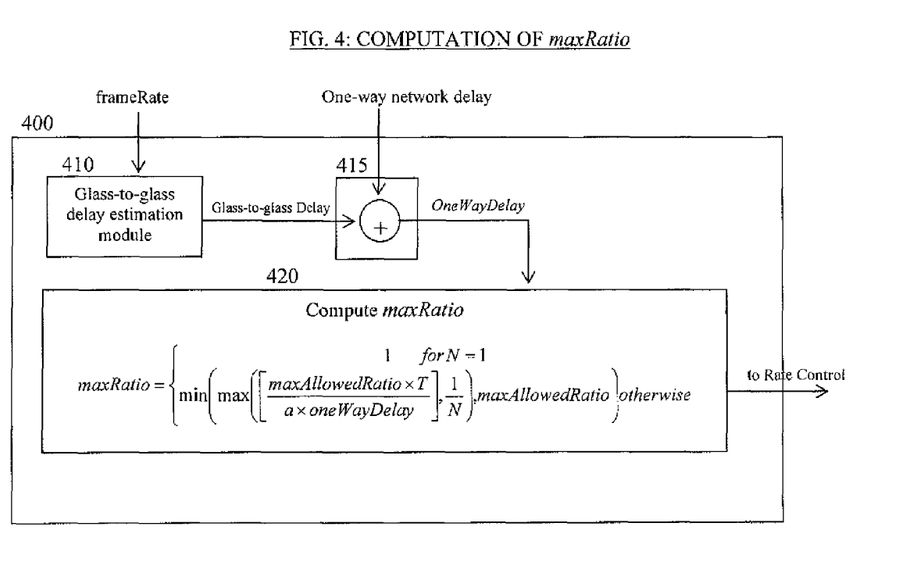
FIG. 4 is a schematic illustration of an exemplary mechanism illustrating the computation of the maxRatio parameter in accordance with the present invention.

FIG. 4 shows the architecture of an exemplary mechanism illustrating the computation of the maxRatio parameter of the present invention. The mechanism 400 includes a glass-to-glass (e.g., camera to display) delay estimation module 410, a one-way delay computation module 415, and a delay evaluation module 420.

The interaction of the various modules depicted in FIG. 4 can be as follows:

A glass-to-glass delay estimation module 410 estimates the glass-to-glass delay based on the frame rate. The frame rate can be constant or can vary with factors known to the system, such as computational load and network limitations, and user preferences. The mechanisms for determining the glass-to-glass delay in the glass-to-glass delay estimation module 410 are discussed later. The estimated glass-to-glass delay is added to the network delay, which can be obtained from the transport protocol implementation, also discussed later. The aforementioned calculation yields a one way delay. A module 420 derives, based on the one way delay, a parameter maxRatio that is used to limit the fluctuation in target coded picture size, i.e., targetBits(i), computed by the target bit rate calculator in the rate control module.

In the same or another embodiment, a glass-to-glass delay estimation module 410 receives data from the video conferencing system regarding the frame rate at which the video encoder is operating and the network delay (based, for example, on RTCP reports) and, using these numbers, estimates the system's glass-to-glass delay. In this embodiment, the glass-to-glass delay can preferably be calculated under the assumption that the encoder and decoder's contribution to the glass-to-glass delay can be calculated by multiplying the average picture duration (the inverse of the frame rate) with a constant factor (for example, one for the encoder, and two for the decoder). The above numbers are based on practical experience to the extent that the encoder processing and leaky bucket delay (see aforementioned paper by Ribas-Corbera et. al.) can be one frame time under ideal circumstances. On the receiver side, the decoding time can be small. However, a practical system can involve a uniform display buffer (alternatively known as "jitter buffer") which can allow for three frames and, in practice, adds about two frames of delay. Accordingly, preferably, a two frame delay is factored in for decoder operation by the glass-to-glass delay estimation module 410.

In the same or another embodiment, more complex glass-to-glass delay calculations can advantageously be used. As an example, the glass-to-glass delay can be determined by taking into account the following two accumulative factors: First, the encoder-side glass-to-glass delay (i.e., the part of the glass-to-glass delay introduced by the sending encoder). This delay is dependent on the encoder's implementation and the picture interval of the recently coded pictures (i.e., the inverse of the frame rate) the encoder has recently produced or is currently producing. As the glass-to-glass delay estimation module is also part of the encoder, it can be assumed to be known with fair precision by any full encoder implementation that includes the invention presented. Second, the decoder-side glass-to-glass delay (i.e., the part of the glass-to-glass delay introduced by the receiving decoder) can either be known in the decoder, and communicated to the encoder through signaling, or it can be estimated by the encoder. In the same or another embodiment, advantageously only in the absence of the aforementioned signaling, the estimation of the decoder-side glass-to-glass display is performed by assuming, on the encoder's side, that the decoder delay on the decoding side is the same as in the decoder implementation of the sending video conferencing system (using the assumption that both implementations are likely competitive in the marketplace, and neither can be outrageously higher in delay than the other, because an outrageously high delay decoder manufacturer would quickly be out of the marketplace due to an uncompetitive product). Since the characteristics of the decoder delay on the encoding side are known, an estimate for the decoder delay on the decoding side can be easily derived.

The one way transmission delay can preferably be estimated through protocol mechanisms, such as the combination of RTCP sender reports and RTCP receiver reports, or any other suitable protocol based mechanism. Alternatively, or in addition, other estimation techniques can also be used, advantageously only during those time intervals where a good application layer transmission delay measurement through RTCP has not (yet) become available. Many other one way transmission delay mechanisms are known in the art; as an example, the feedback provided by ICMP can be used.

The transmission delay is added to the glass-to-glass delay in module 415 to compute the one-way delay.

In some embodiments, the invention advantageously optimizes the number of bits allocated to pictures in each layer differently, so that two factors are balanced: (1) the desire for low delay (best achieved by keeping the picture size uniform, even across layers), and (2) the desire for high quality (best achieved by non-uniform picture sizes; in a multi-layer environment, "higher" layer pictures should be allocated fewer bits than lower layer pictures, as explained in greater detail below). In order to describe these aspects of the invention, FIG. 3 will be referred to as one example of a prediction structure. As a person skilled in the art can readily determine, the mechanism can be easily modified to cover different prediction structures, including those with more or fewer temporal layers, longer prediction periods and/or including bi-predicted pictures (B-pictures).

One advantage of the hierarchical prediction structure, which pertains to the present invention, is that with appropriate coded picture size modulation, a coding efficiency advantage is typically realized relative to a non-hierarchical prediction structure. That is, for a given input video sequence a hierarchically predicted video encoding of that sequence with coded picture size modulation can produce the same quality video as that produced using a non-hierarchical prediction structure, but requiring fewer bits.

To achieve superior coding efficiency with hierarchical prediction, the target coded picture size is modulated such that pictures in higher temporal layers are associated with lower target bit rates, and conversely, lower layers are associated with larger target bit rates.

In the same or another embodiment, the exact values for the picture-to-picture target bit rates may be determined by an automated temporal bit rate allocation (ATBA) mechanism as disclosed in the co-pending U.S. patent application Ser. No. 12/897,365. The present invention limits the bit rate adaptation policies of ATBA, or comparable mechanisms, by observing delay constraints.

While the coding efficiency associated with hierarchical prediction and appropriate modulation of the target coded picture size is advantageous, the associated target coded picture size fluctuations can be undesirable under certain circumstances. Specifically, as described earlier, coded picture size fluctuations can result in unwanted delay over capacity-limited links. When delay results from bit rate fluctuations, it is typically small in comparison to the total one-way delay (for example, less than 15%, depending on system configuration and network delay). Nevertheless, under certain circumstances it can be advantageous to reduce coded picture size fluctuations to optimize even this small delay.

The present invention allows for the control of the target picture bit rate in the context of hierarchical prediction in order to limit picture-to-picture bit rate fluctuations, thereby reducing delay (at the expense of coding efficiency) in situations where additional delay is deemed to be a problem.

As illustrated in FIG. 4, the Compute maxRatio module 420 shall now be discussed. A purpose of this module is to determine a value for maxRatio. Informally put, maxRatio limits the coded picture size fluctuations as described in detail later.

More specifically, in the same or another embodiment, maxRatio can be determined based on the one way delay, predetermined constants a and T, and the value of maxAllowedRatio as shown in the equation in the Compute maxRatio module 420.

The value of the constant T represents the largest one-way delay deemed acceptable. Both the nature of the application and personal preferences of users can play a role in the determination of T. For interactive communication such as multi-point video conferencing, one sensible choice can be, for example, T=250 ms. T can be influenced not only by the nature of the application, but also by user input (favor delay over quality slider) in the user interface of a video conference or other application.

The value of the constant N represents the number of pictures in a prediction structure. For example, for the prediction structure shown in FIG. 3, N=4.

The value of the constant a represents another predetermined and application-specific constant. In one example, for interactive video communication, advantageously, a=1.375.

Figure 5:
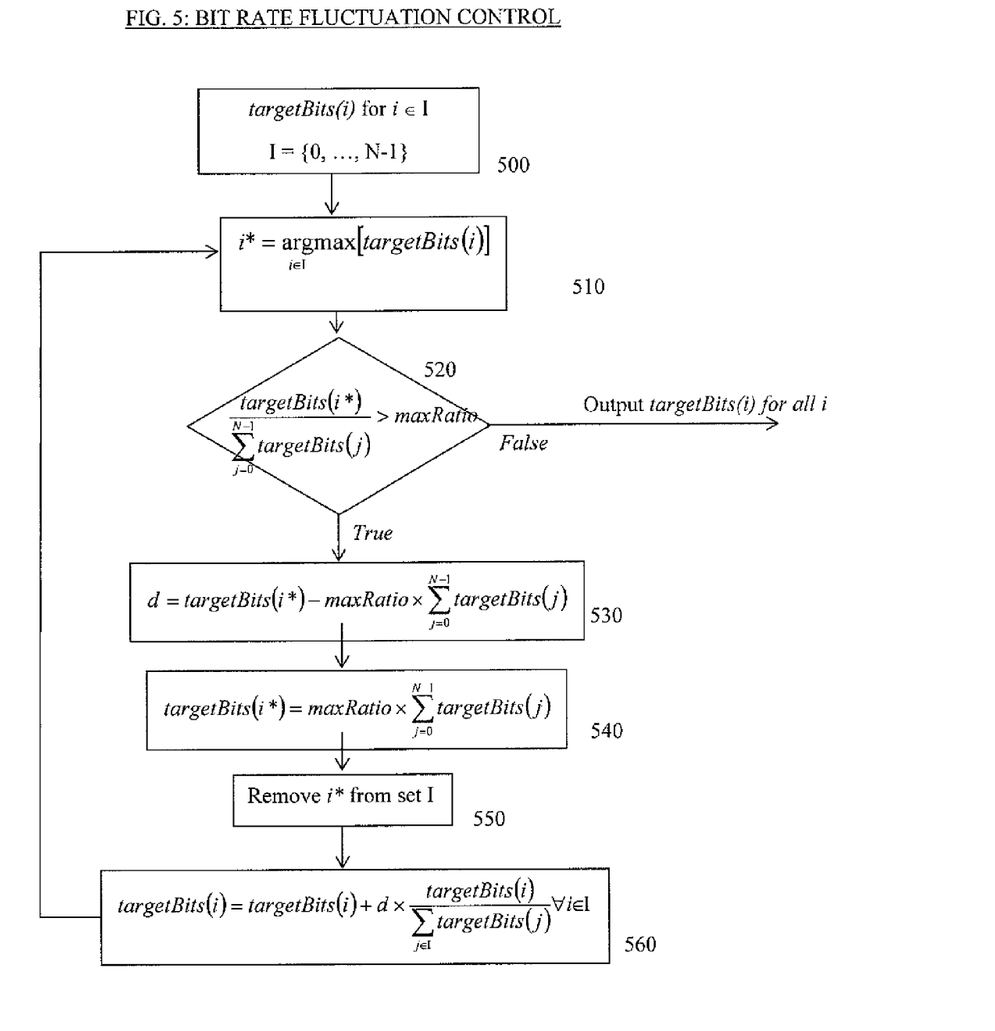
FIG. 5 is an illustration of a flow diagram illustrating an exemplary bit rate fluctuation control mechanism in accordance with the present invention.

FIG. 5 shows the flow diagram of an exemplary bit rate fluctuation control mechanism. The bit rate fluctuation control mechanism resides in the rate control module illustrated in FIG. 2. The bit rate fluctuation control mechanism operates on input values of targetBits(i), which can be determined prior to the application of the bit rate fluctuation control mechanism, using a rate control mechanism such as the one described in the co-pending U.S. patent application Ser. No. 12/897,365. The bit rate fluctuation control mechanism limits the ratio of the bits allocated to each of the pictures in one period of the prediction structure to the total number of bits allocated for all pictures in the structure period. More precisely, the value of the target number of bits for the $i^{th}$ picture in a prediction structure period, targetBits(i), containing N pictures, is limited by the following inequality:

$$\frac{targetBits(i)}{\sum_{j=0}^{N-1} targetBits(j)} \leq maxRatio \forall\, i = 0,\,,N-1 \tag{1}$$

An exemplary mechanism for modifying the input values of targetBits( ) so as to limit the above mentioned ratio is shown in FIG. 5. Module 500 shows the input of the initial values of targetBits(i) for the indexes i∈I where set I={0, . . . , N−1} contains one index for each picture in a prediction period. Module 510 determines i*, the index in associated with the largest value of targetBits( ). If the condition in module 520, $$\frac{targetBits(i^*)}{\sum_{j=0}^{N-1} targetBits(j)} > maxRatio,$$

is true, the bit rate fluctuation control mechanism reduces the value of targetBits(i*); otherwise all values of targetBits( ) satisfy inequality (1), above, and the mechanism outputs values of targetBits(i) for all i∈{0, . . . , N−1} and terminates. In module 530, d, the difference between targetBits(i*) and the quantity $$maxRatio \times \sum_{j=0}^{N-1} targetBits(j)$$

is computed. The value of targetBits(i*) is set to $$maxRatio \times \sum_{j=0}^{N-1} targetBits(j)$$

in module 540. The value of d represents the number of bits by which the value of targetBits(i*) was reduced to ensure that $$\frac{targetBits(i^*)}{\sum_{j=0}^{N-1} targetBits(j)} \leq maxRatio.$$

Modules 550 and 560 show how the d bits taken from targetBits(i*) are redistributed among the remaining targetBits( ) values. In module 550, index i* is removed from set I, and in module 560, the values of targetBits( ) for all indexes in the newly updated set I are computed as $$targetBits(i) = targetBits(i) + d \times \frac{targetBits(i)}{\sum_{j \in I} targetBits(j)} \, \forall \, i \in I.$$

After d bits are distributed in module 560, the flow returns to module 510. The mechanism continues to iterate in the above described manner until the condition in module 520 is false, at which time the values for targetBits( ) are outputted, and the mechanism terminates. It is important to note that the argmax[ ] in module 510 and the sum in the denominator of the ratio in module 560, i.e., $$\sum_{j \in I} targetBits(j),$$

use only those indexes in the updated (i.e., reduced) set I.

The value of maxRatio is computed as a function of the total estimated one-way delay, oneWayDelay (in milliseconds), $$maxRatio = \begin{cases} 1 & \text{for } N = 1 \\ \frac{maxAllowedRatio \times T}{a \times oneWayDelay} & \text{otherwise} \end{cases} \quad (2)$$

where the value of the constant T represents the largest one-way delay deemed acceptable and a is a constant.

In the same or another embodiment, the value of T can be assigned a value, 250 ms, for example, as this is a sensible choice for a one way delay in a video conferencing system (other systems can warrant different values for T). Further, a can be assigned a value between, for example, 1.25 and 1.5. The value of oneWayDelay can advantageously be calculated at least twice per second or as often as new information about the one way delay becomes available (i.e., through the reception of RTCP receiver reports, which, in many systems, are available in sub-second intervals).

In the same or another embodiment, the values of maxRatio are limited by the following inequality $$maxAllowedRatio \geq maxRatio \geq \frac{1}{N}. \quad (3)$$

Note that as the value of oneWayDelay increases, the value of maxRatio decreases until when maxRatio achieves its minimum value, (i.e., additional increases in values of oneWayDelay do not lead to a further decrease in maxRatio) leading to the situation where all pictures in the prediction period have the same target size (i.e., rate fluctuations approach zero). On the other hand, when maxRatio achieves its maximum value, maxAllowedRatio (i.e., additional decreases in values of oneWayDelay do not lead to a further increases in maxRatio), thereby enabling a modulation of the target bit rate that typically results in improved coding efficiency.

In the same or another embodiment, the parameter maxAllowedRatio can be assigned a value of, for example, 0.75. Empirical evidence obtained in a video conferencing system suggests that the coding efficiency gain does not justify the skew in picture size above 0.75 that would be a useful trade-off for the additional delay obtained by such larger values of maxAllowedRatio. It is noted that two adjacent pictures having values for targetBits(i) such that the ratio $$\frac{targetBits(i)}{\sum_{j=0}^{N-1} targetBits(j)}$$

is close but does not exceed the value of maxRatio, can introduce latency. In practice, however, in the context of a hierarchical P prediction structure, the calculate targetBits(i) module illustrated in FIG. 2 may not assign values to targetBits(i) in such a manner, and it is sufficient to ensure that a single picture does not cause the value of maxRatio to be exceeded.

It will be understood that in accordance with the present invention, the bit rate fluctuation control techniques described herein can be implemented using any suitable combination of hardware and software. The software (i.e., instructions) for implementing and operating the aforementioned rate estimation and control techniques can be provided on computer-readable media, which can include, without limitation, firmware, memory, storage devices, microcontrollers, microprocessors, integrated circuits, ASICs, downloadable media, and other available media.

What is claimed is:

1. A method of determining a target number of bits for each of a plurality of coded pictures in a prediction structure having a hierarchy of temporal layers, each of the plurality of coded pictures belonging to one of the temporal layers, comprising:
    (a) determining a one way delay taking into account at least a network delay and glass-to-glass-delay,
    (b) computing a parameter maxRatio indicative of a limitation of a fluctuation of a coded picture size for at least one of the plurality of coded pictures, and
    (c) modulating a target coded picture size for each of the plurality of coded pictures based on the computed parameter maxRatio, the one-way delay and a position of the coded picture in the hierarchy of the temporal layers, such that the target number of bits varies for each of the plurality of coded pictures in the prediction structure but stays within the limitation of the fluctuation of the coded picture size as indicated by the parameter maxRatio.

2. The method of claim 1, wherein the modulation is bounded by at least one of a first upper threshold for an allowed delay and a second lower threshold for the allowed delay.

3. The method of claim 1, wherein the parameter maxRatio is adjusted based on an increase or decrease of the end-to-end delay over time.

4. The method of claim 1, wherein the parameter maxRatio is adjusted based on user input.

5. The method of claim 1, wherein the one way delay is determined by taking into account an end-to-end delay between an encoder and all decoders in a multipoint conference.

6. The method of claim 5, wherein the one way delay is determined by using the longest end-to-end delay between the encoder and at least two of the decoders in the multipoint conference.

7. The method of claim 5, wherein the one way delay is determined by using a weighted average over the delay between the end-to-end delays between the encoder and at least two of the decoders in the multipoint conference.

8. The method of claim 1, wherein the fluctuation of coded picture size decreases with an increase in the one way delay.

9. A non-transitory computer-readable storage medium comprising a set of executable instructions to direct a processor to perform the methods in one of claims 5-7.

* * * * *